United States Patent [19]

Phillips

[11] 4,256,145

[45] Mar. 17, 1981

[54] IMPACT TYPE TOOLS

[75] Inventor: Reginald A. Phillips, Skelmersdale, England

[73] Assignee: Dobson Park Industries Limited, England

[21] Appl. No.: 935,047

[22] Filed: Aug. 18, 1978

Related U.S. Application Data

[63] Continuation of Ser. No. 763,473, Jan. 28, 1977, abandoned.

[30] Foreign Application Priority Data

Jan. 29, 1976 [GB] United Kingdom ................ 3446/76

[51] Int. Cl.[3] ............................................ F16L 55/04

[52] U.S. Cl. ........................................ 138/31; 173/90

[58] Field of Search ................ 138/31, 30, 26; 173/90

[56] References Cited

U.S. PATENT DOCUMENTS

| | | | |
|---|---|---|---|
| 2,876,799 | 3/1959 | Mercier | 138/31 |
| 3,015,345 | 1/1962 | Michael | 138/31 |
| 3,198,213 | 8/1965 | Schindel | 138/31 |
| 3,454,050 | 7/1969 | Wolf | 138/31 |

FOREIGN PATENT DOCUMENTS

| | | | |
|---|---|---|---|
| 1356022 | 6/1974 | United Kingdom | 138/31 |

*Primary Examiner*—Lenard A. Footland
*Attorney, Agent, or Firm*—William A. Drucker

[57] ABSTRACT

A pressure fluid operated impact type tool having cyclic pressure fluid operation of a reciprocable hammer piston, and for which there is provided accumulator means connected directly to pressure fluid supply and-/or return of the tool.

15 Claims, 4 Drawing Figures

Figure 4:
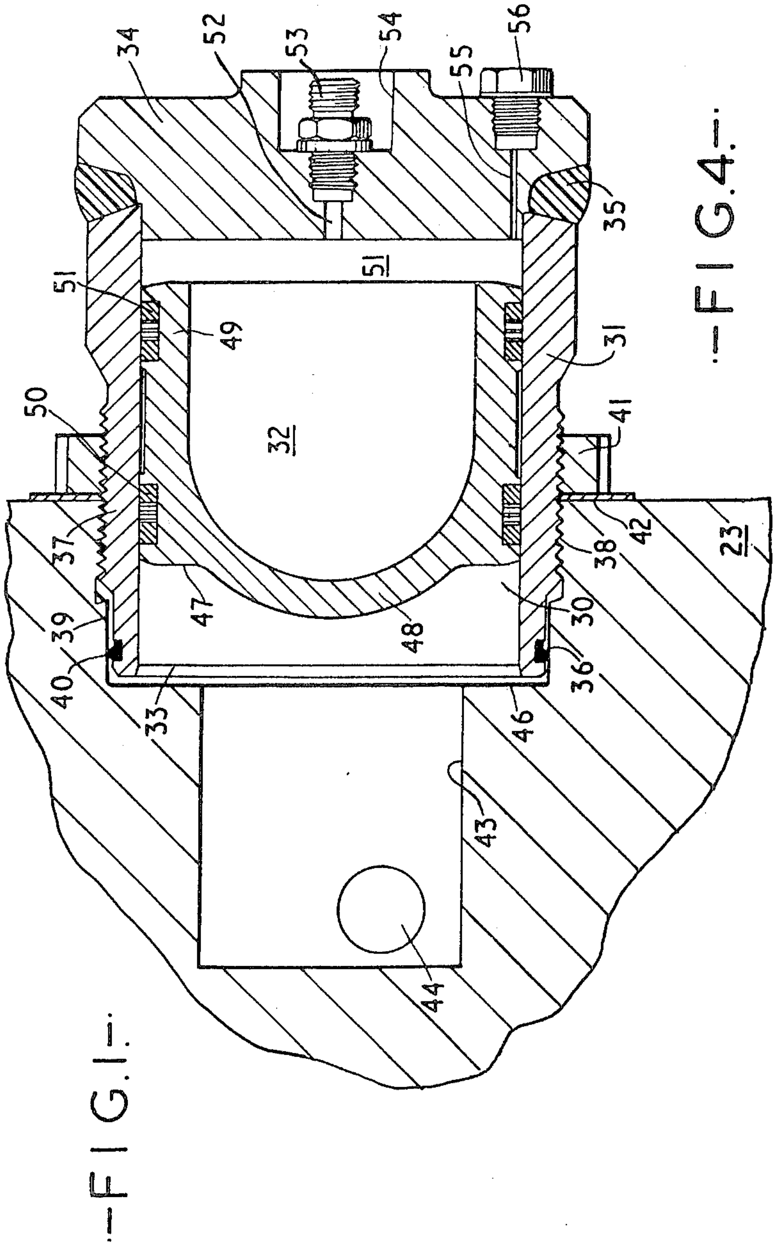

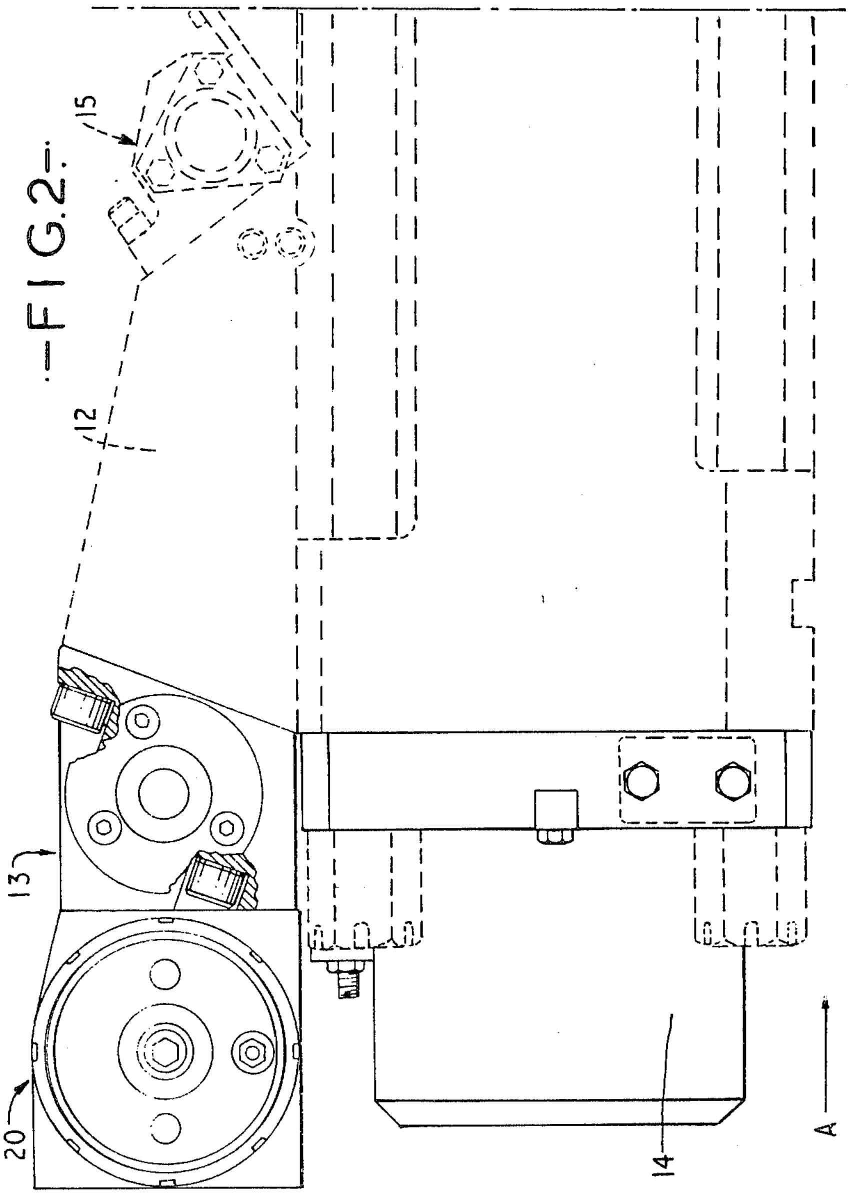
-FIG.2-

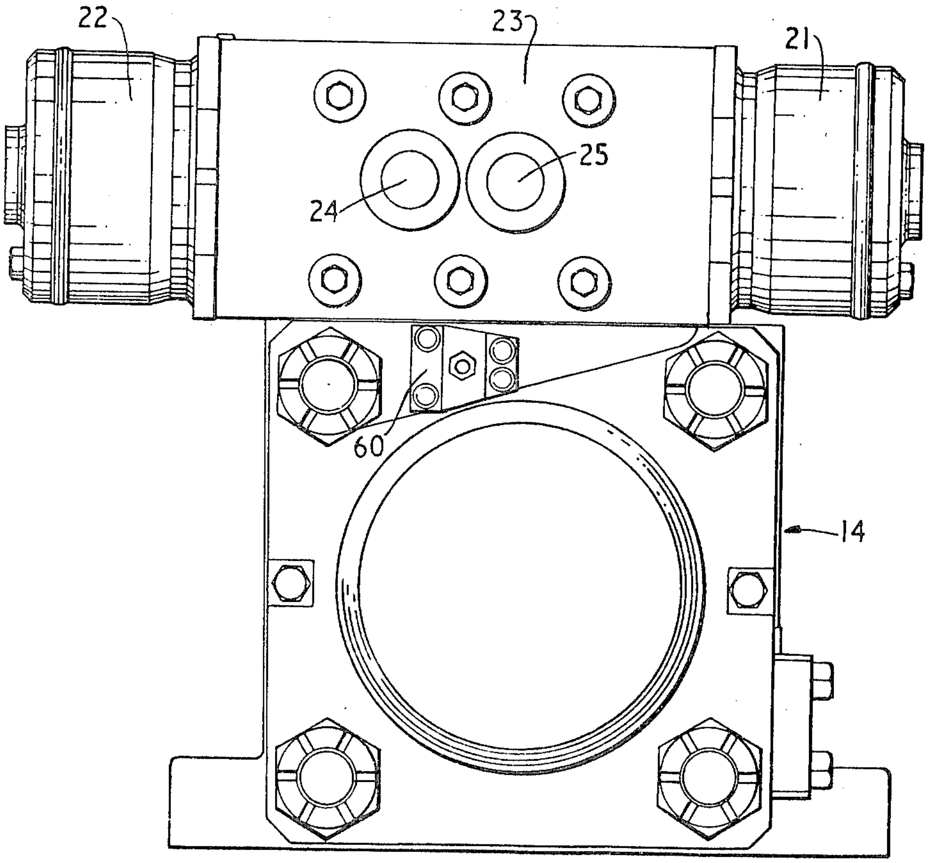
—FIG.3—

IMPACT TYPE TOOLS

This is a continuation of Ser. No. 763,473 filed Jan. 28, 1977, abandoned.

The invention relates to impact tools for winning or removing material from solid formations as in mining or quarrying.

Often, such impact type tools are operated by application of pressure-fluid to a reciprocable piston and hammer arrangement for driving a chisel or other rock-breaking impactor. One preferred form of such a tool is described in British Patent Specification No. 1,356,022 and comprises a driving piston arrangement using a compressible, i.e. gaseous, pressure-fluid for the impact stroke and an incompressible, i.e. liquid, pressure-fluid for the return stroke, with a pressure sensitive system including a pilot valve controlling a main valve operative to apply the incompressible pressure-fluid. As with any other impact type pressure-fluid-operated tool, impulsing of the pressure-fluid takes place as a result of operation of the tool, and this leads to problems in containing the fluid particularly in relation to the use of flexible hoses which tend to burst after a period of use. Also, rapid flexing of hoses resulting from impulsing and relative to, or even together with, conduits connected therewith can cause fractures and leaks at or near couplings that are desired to be fluid tight.

It is an object of the invention to mitigate such problems and, to this end, pressure-fluid impulse absorption means is or are provided, preferably at the impact type tool itself.

According to one aspect of the invention there is provided, in or for a pressure-fluid-operated impact type tool having a reciprocable hammer device driven and controlled by piston and valve means, pressure-fluid impulse absorption means directly connected to pressure fluid supply and/or return of the tool. Preferably the impulse absorption means is coupled to the tool by rigid passageway providing means and may be adapted for mounting directly to the tool, say via a connector block that affords pressure-fluid feed and/or return couplings to the tool, say to a main valve thereof, and serves to receive pressure-fluid impulses resulting from driving said hammer device.

Preferably, separate accumulator devices for the absorption of pressure-fluid impulses are provided for supply and drain of hydraulic fluid though they may be embodied in a single body or block. These accumulator devices may be mounted to a connector block immediately adjacent the main valve and have direct access therewith. Alternatively, accumulator devices, whether or not embodied in a common body, may be mounted to the tool at a different, relatively remote, position with rigid, heavy duty, preferably steel, tubing between them and the main valve or between associated connector blocks therefor.

Use of embodiments of the invention can result in improved fluid flow characteristics in making stored energy available for the return stroke of an impactor of the type specifically referred to above and/or affording space to accommodate fluid displaced by a piston exhaust stroke. A particularly useful energy storage capability is thus afforded to low volume pumps.

According to another aspect of the invention a preferred accumulator comprises a hollow piston closed to the pressure-fluid subject to impulses and open to a chamber for compressible fluid at a desired, preferably variable, pressure, the piston being movable against the compressible fluid pressure by said impulses.

Conveniently, for such an accumulator, the piston is sealingly mounted in a cylinder to present a domed crown or head to an open end of the cylinder for communicating with the impulse pressure-fluid, the other end of the cylinder being closed and fitted with gas charging means, for example readily releasable pressure sealed valve. The cylinder is preferably securable as a whole to a connector block having a channel for the working pressure-fluid subject to impulsing, cooperating screw threads being suitable for such securing. Then, the connector block itself may serve to limit movement of the accumulator piston under the gas pressure.

Clearly, many other types of piston/seal arrangements would be viable in practice, for example using a gland type sealing arrangement.

The accumulator piston may face the working fluid directly, with supply or drain taken at an angle thereto or may be connected to a branch from a substantially straight path through the connector block for supply or drain.

Figure 1:
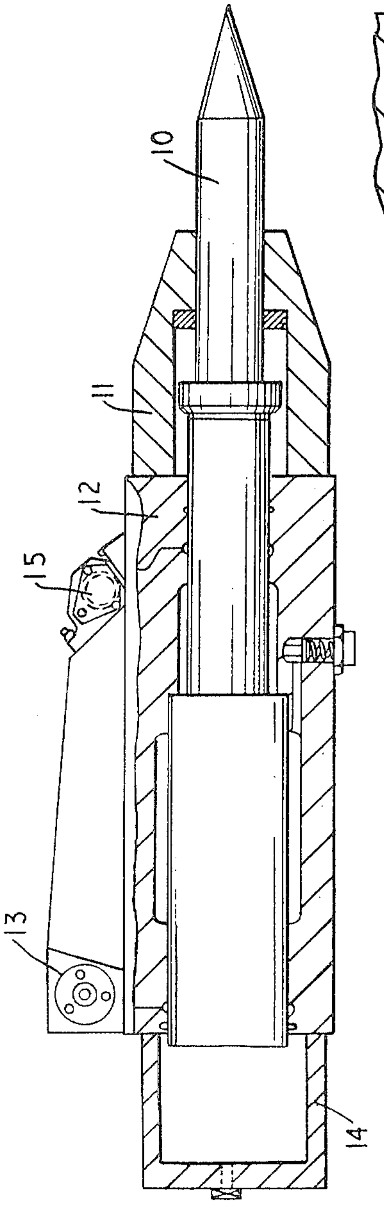

One embodiment of the invention will now be described by way of example, with reference to the accompanying drawings, in which:

FIG. 1 shows, diagrammatically, a rock-breaker impact tool of the tool of the type more fully described in British Patent Specification No. 1,356,022;

FIG. 2 indicates a convenient mounting, to a specific tool of the type shown in FIG. 1, of accumulator means embodying this invention;

FIG. 3 shows a view of the accumulator means and a connector block taken in the direction of the arrow A of FIG. 2; and FIG. 4 is a section through a preferred accumulator device of FIG. 2.

The impact type rock-breaker tool shown generally in FIG. 1 has a chisel type rock breaker 10 slidably mounted and axially guided in a fore-housing 11 and driven by means of a hammer/piston and valve gear associated with a main housing 12. Specifically, an incompressible pressure-medium is applied via a main valve 13 to retract the hammer/piston from the rock breaker 10 against a compressible pressure-medium within a rear housing part 14 until a given pressure is achieved therein, when the incompressible pressure-medium is returned to drain and the hammer piston driven forwards by the expansion of the compressible medium, As described in the aforementioned application, control of the relatively heavy duty main valve 13 is preferably by way of a pilot valve 15 operative at much lighter ratings.

The main valve 13 and pilot valve 15 are indicated as being bolted directly to the main housing 12 for communicating with the tool driving piston via passageways formed therein. As shown in FIG. 2, accumulator means 20 is connected directly to the main valve 15. As best seen in FIG. 3, this accumulator means 20 comprises two separate accumulators 21 and 22 secured in a connector block 23 having separate input ports 24 and 25 for feed and drain hydraulic lines.

As best seen in FIG. 4, a preferred accumulator comprises a cylinder 30 having a tubular part 31 accommodating a piston 32, and having one end 33 that is open and its other end closed by a cover member 34 secured thereto, for example by welding 35. The cylinder is externally formed with a seal locating groove 36 near its open mouth 33 where it is of reduced outside diameter compared with an adjacent threaded portion 37 for engaging a correspondingly threaded hole 38 in the connecting block 23 that extends into a preferably inwardly tapering part 39, against which a sealing 40 in the groove 36 will seat. A lock nut 41 and tab washer 42 are shown about the threaded part 37 to coact with the connector block in securing the accumulator.

The open end 33 of the accumulator cylinder communicates directly with a blind bore 43 of relatively reduced diameter that itself communicates with a through-bore 44 extending from the port 22, and presents a shoulder 46 to limit movement of the piston.

The piston has a side-chamfered annular end surface 47 to cooperate with the shoulder 46, and a central domed crown 48 against which hydraulic pressure-fluid will act. A generally cylindrical skirt 49 of the piston is shown with two spaced circumferential grooves accommodating seal-mounting rings 50 and 51. The cover member 34 of the cylinder has a centrally disposed bore 52 formed with the thread to mount a one-way valve 53, e.g. Schrader in a recess 54, and a bleed channel 55 fitted with a bleed valve 56 for any hydraulic fluid that, in operation, may leak past the piston seals.

In operation, the closed chamber 57 formed by the interior of the piston and the cover member 34 is charged via the one-way valve with a desired gas, normally nitrogen or another inert gas, pressure as required to absorb impulses in a hydraulic pressure medium.

FIG. 3 also shows the rear housing part 14 of the rock breaker tool and indicates an adjustable valve 60 for setting the pressure of the compressible medium driving the impactor hammer. This controls the interval between impact strokes for a given value of pressure-sending control of the pilot valve and thus the main valve. Such pressure setting control is made more effective by the use of the accumulators of this invention as, hitherto, inherent reasonance of the tool parts has tended to override the intended effect of pressure adjustment so that, instead of achieving substantially different frequencies of full power impacting, a varying power of impact at or near the resonance frequency has been likely to result.

It is to be understood that various specific constructional features, such as the nature of the seals, the directions and relative dimensions of the pressure-fluid bores and accumulator bores in the connector block, and the nature, shape and configuration of the piston are open to variation. For example, the accumulator bore may be aligned with the hydraulic pressure medium passage to the main valve and a passage provided therefrom to the connecting port at an angle, so that the accumulator piston directly faces the impulse medium. Also, different relative diameters may apply to the accumulator and pressure-fluid supply or drain bores within the connector block. Furthermore, the crown, or indeed all of the piston may be of flexible material which, if desired, may be located so that the flexible material acts as a deformable membrane which, if required, could be resilient.

I claim:

1. In combination (i) a pressure-fluid accumulator comprising a cylinder for mounting to a connector block having passage means for feed and return of pressure fluid to a tool, said cylinder having a first end and a second end, the first end being open and being adapted for connection to the connector block to communicate with one of said passage means, the second end being closed by a cover, a hollow piston slidable longitudinally in said cylinder and sealed thereto in fluid-tight manner, said hollow piston and said cylinder and said cylinder cover together bounding a gas space, and valve means on said cover communicating with said gas space for charging said gas space with gas at a predetermined pressure; and (ii) a connector block threadingly engaged with the accumulator and having passage means for feed and return of pressure fluid to a tool, said connector block including a recess bounded by a shoulder, and said cylinder being secured in said recess with the open end of the cylinder facing said shoulder, such that said shoulder may be abutted by said piston to limit travel of said piston in the direction towards the open end of the cylinder.

2. The combination, as claimed in claim 1, wherein said hollow piston presents a domed head to said open end of said cylinder.

3. The combination, as claimed in claim 1, wherein said valve means is a one-way inlet valve.

4. A pressure fluid operated impact tool comprising a hydraulically retracted drive piston and cylinder therefor, main control valve means for supply and return of hydraulic pressure fluid for the piston, hydraulic pressure fluid impulse absorption means for both of hydraulic pressure fluid flow and return, and rigid hydraulic pressure fluid passageways between the control valve means, the drive piston cylinder and the impulse absorption means, wherein said hydraulic pressure fluid absorption means is the combination claimed in claim 1, said rigid hydraulic pressure fluid passageways being provided by said connector-block.

5. A pressure fluid operated impact tool comprising a hydraulically retracted drive piston and cylinder therefor, main control valve means for supply and return of hydraulic pressure fluid for the piston, hydraulic pressure fluid impulse absorption means for both of hydraulic pressure fluid flow and return, and rigid hydraulic pressure fluid passageways between the control valve means, the drive piston cylinder and the impulse absorption means, comprising a chamber of compressible pressure fluid that is compressed by the drive piston on retraction thereof by said hydraulic fluid until a predetermined pressure of the compressible fluid is reached, and means responsive to said predetermined pressure to operate the control valve means to switch to hydraulic fluid return from the drive piston chamber.

6. An impact tool according to claim 5, wherein each impulse absorption means is mounted to the tool by way of a connector block affording pressure-fluid feed and return couplings to the tool.

7. An impact tool according to claim 6, where the connector block is mounted immediately adjacent the main valve of the tool.

8. An impact tool according to claim 7, wherein each impulse absorption means comprises a pressure-fluid accumulator.

9. An impact tool according to claim 8, wherein each accumulator comprises a hollow piston closed to the pressure-fluid subject to pulses and open to a chamber for compressible fluid at a desired pressure so that the piston is movable against the compressible fluid by said impulses.

10. An impact tool according to claim 9, wherein the compressible fluid pressure is variable.

11. An impact tool according to claim 10, wherein each said piston is sealingly mounted in a cylinder to present a domed crown or head to an open end of the cylinder for communicating with the impulsed pressure fluid, the other end of the cylinder being closed and fitted with gas charging means.

12. An impact tool according to claim 11, wherein each gas charging means comprises one-way gas valve.

13. An impact tool according to claim 9, wherein each said cylinder is securable as a whole to said connector block having a channel for working pressure fluid subject to impulses, with the connector block serving to limit movement of the accumulator piston under the gas pressure.

14. An impact tool according to claim 13, wherein each accumulator piston directly faces the working fluid subject to pulsing.

15. An impact tool according to claim 13, wherein each accumulator piston is connected in a branch from a substantially straight path through the connector block for the pressure fluid.

* * * * *